United States Patent [19]
Tieleman et al.

[11] Patent Number: 5,707,280
[45] Date of Patent: Jan. 13, 1998

[54] CROP INCLUSIVE POULTRY EVISCERATING METHOD AND APPARATUS

[75] Inventors: Rudolf J. Tieleman, Kansas City, Kans.; Lincoln S. Langhorn, Kansas City, Mo.

[73] Assignee: Johnson Food Equipment Inc., Kansas City, Kans.

[21] Appl. No.: 816,490

[22] Filed: Mar. 13, 1997

Related U.S. Application Data

[63] Continuation of Ser. No. 589,114, Jan. 19, 1996, abandoned.
[51] Int. Cl.⁶ .................................................... A22C 21/06
[52] U.S. Cl. ............................................. 452/117; 452/118
[58] Field of Search ................................. 452/117, 118, 452/106, 108, 109, 120, 122, 178, 180

[56] References Cited

U.S. PATENT DOCUMENTS

| | | | |
|---|---|---|---|
| 4,262,387 | 4/1981 | Scheier et al. | 452/117 |
| 4,516,290 | 5/1985 | van Mil | 452/118 |
| 4,561,148 | 12/1985 | Bonuchi | |
| 4,574,427 | 3/1986 | Harben, Jr. et al. | 452/117 |
| 5,189,679 | 2/1993 | Meyn | |
| 5,277,650 | 1/1994 | Meyn | 452/117 |

FOREIGN PATENT DOCUMENTS

| | | |
|---|---|---|
| 0497014 | 12/1991 | European Pat. Off. |
| 0587253 | 3/1994 | European Pat. Off. |

OTHER PUBLICATIONS

International Poultry Production Article, entitled "Dutch Maestro under the Spotlight", date unknown, pp. 13–15.
International Poultry Production Article, entitled "Evisceration Comes Clean", date unknown, pp.13,15,17.
Southeastern Poultry and Egg Association Article, 1995 Poultry Processor Workshop, entitled "Meyn/Maestro Eviscerating System", pp. 1–8.

*Primary Examiner*—Willis Little
*Attorney, Agent, or Firm*—Hovey, Williams, Timmons & Collins

[57] ABSTRACT

The evisceration process removes the entire alimentary tract, including the crop, in one operation and without damaging the tract. After the removal spoon enters the opening at the vent end of the carcass and moves along the breast bone, it swings over against the back wall of the body cavity to clamp the esophagus against the backbone at a point just below the weak region of attachment of the esophagus to the stomach. Simultaneously, a crop loosening hook enters a slit in the neck of the carcass, moves up along the esophagus into the body cavity, and intertwines with the esophagus by rotating through 360°. During the time that the esophagus is clamped against the backbone by the removal spoon, the loosening hook is pulled back down along the esophagus, stripping the crop from its connective tissues and loosening the crop for withdrawal. When the removal spoon is then withdrawn up and out of the cavity, the esophagus pulls the loosened crop up and out of the carcass with the rest of the viscera.

32 Claims, 6 Drawing Sheets

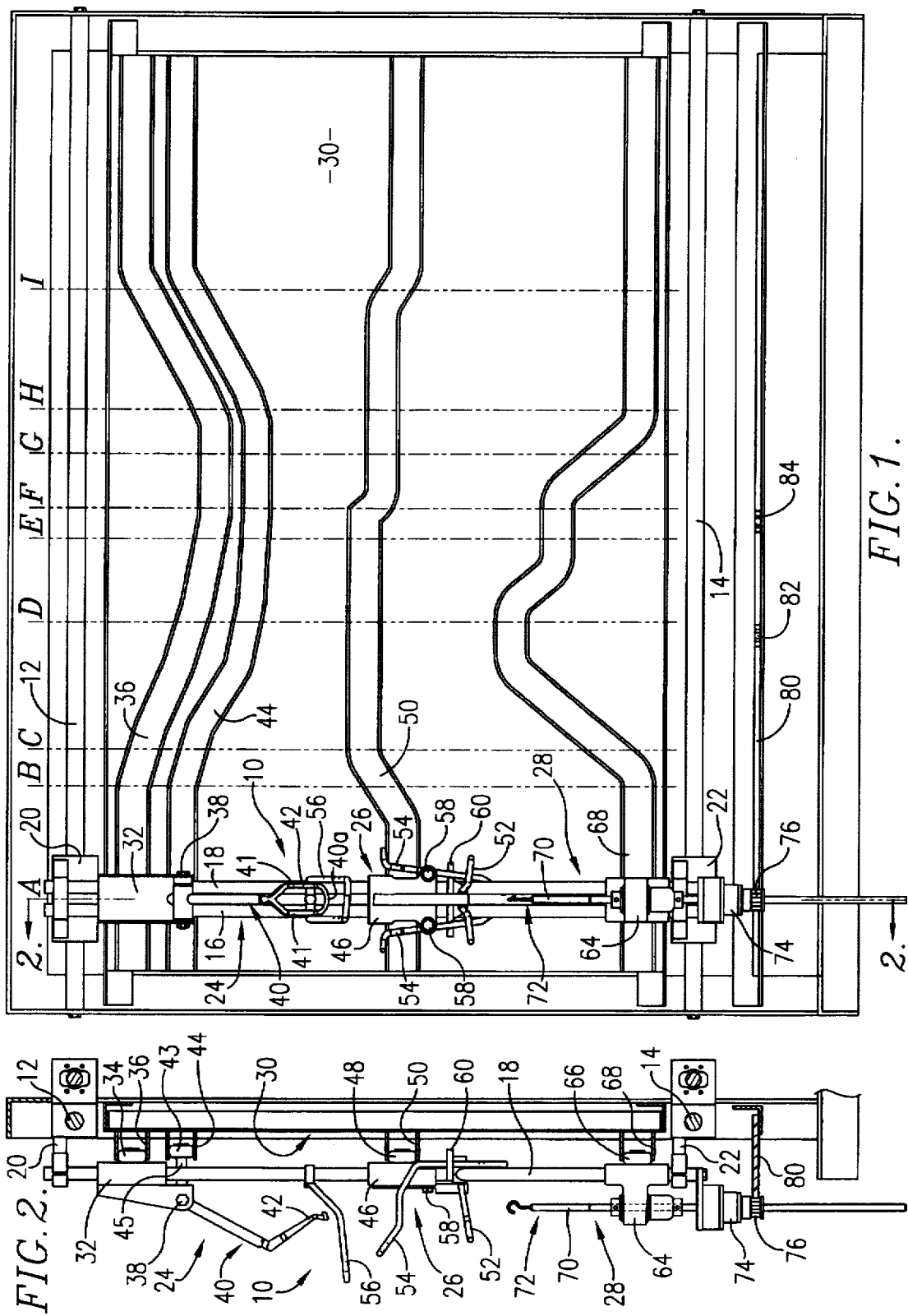

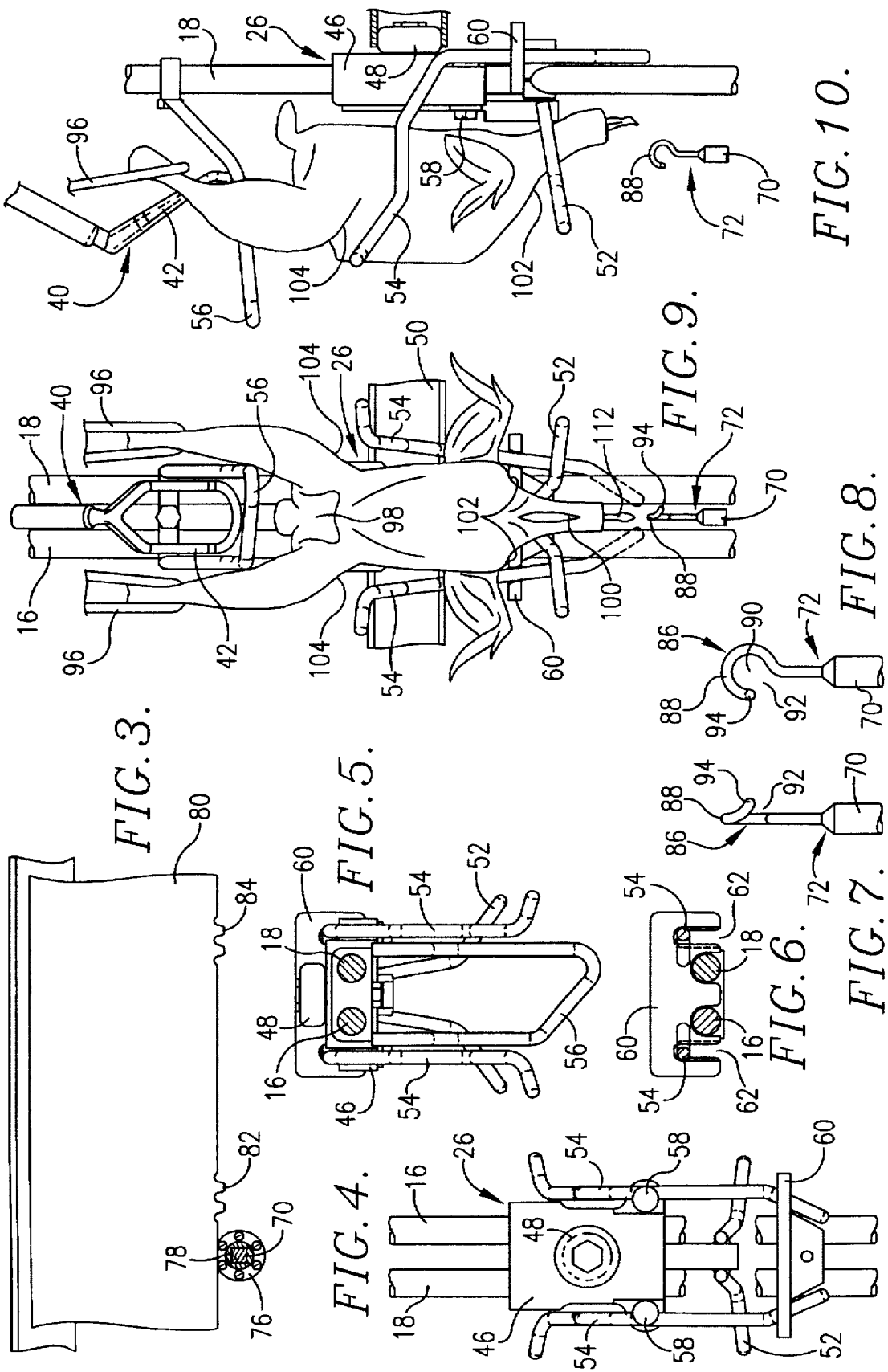

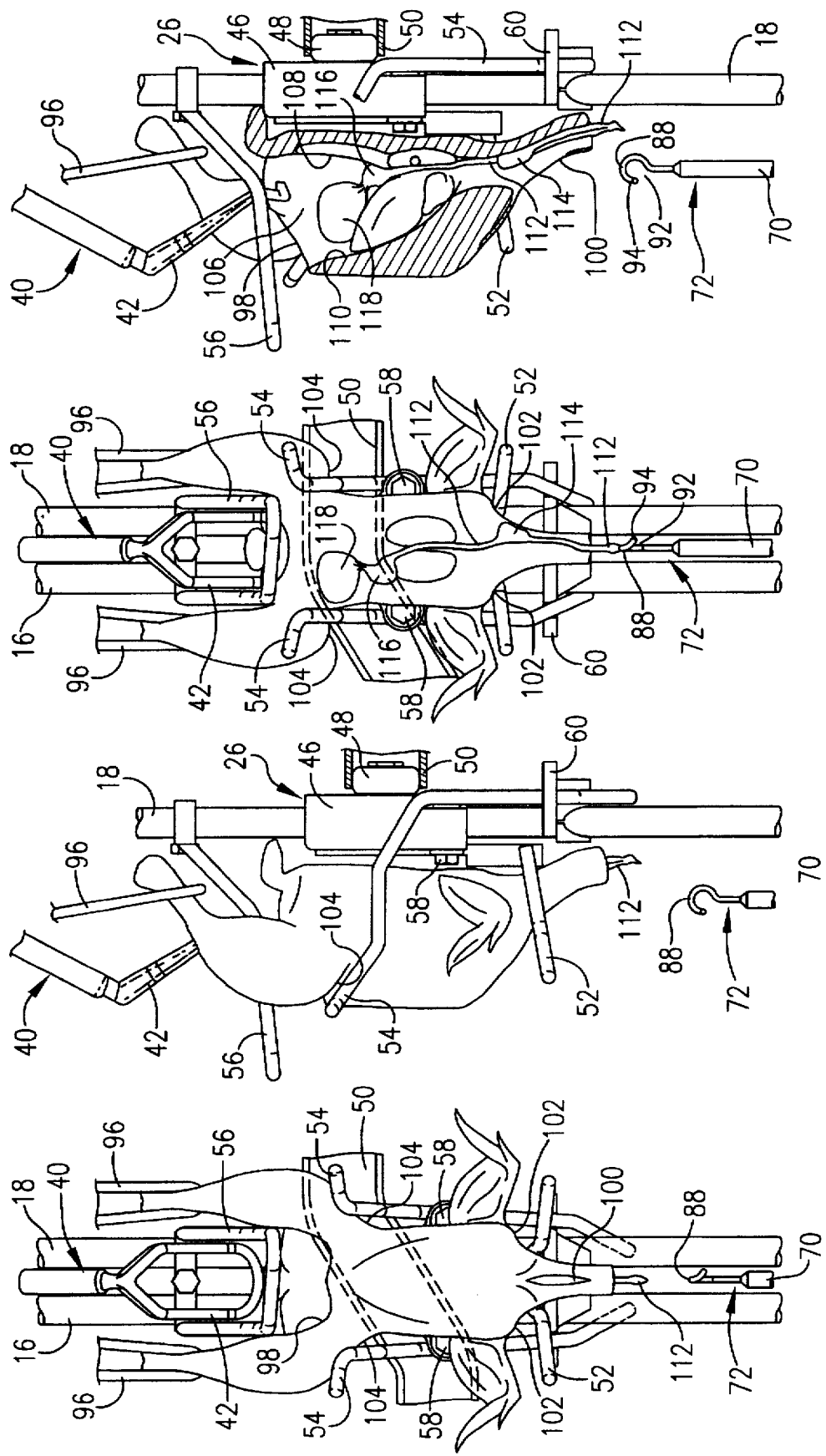

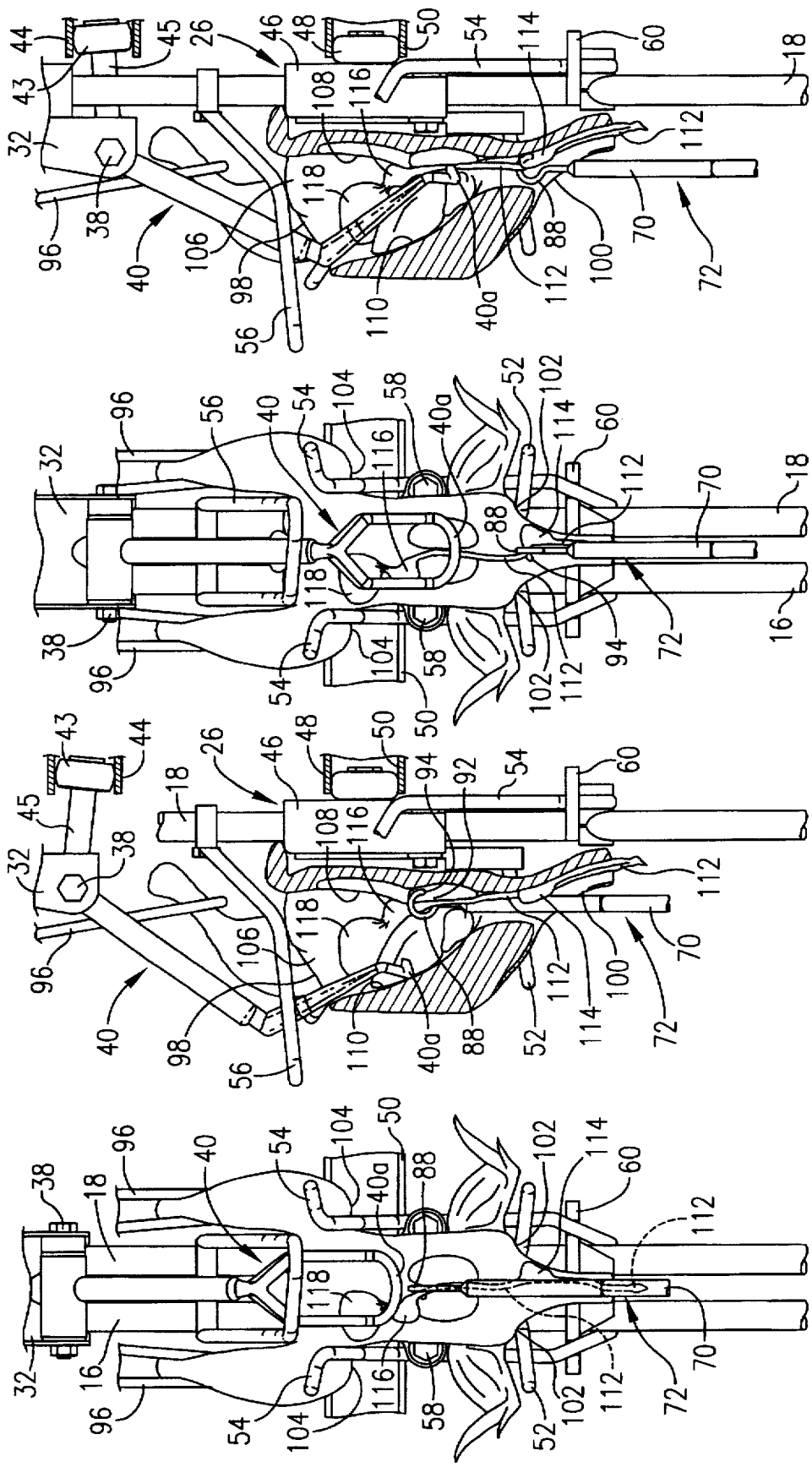

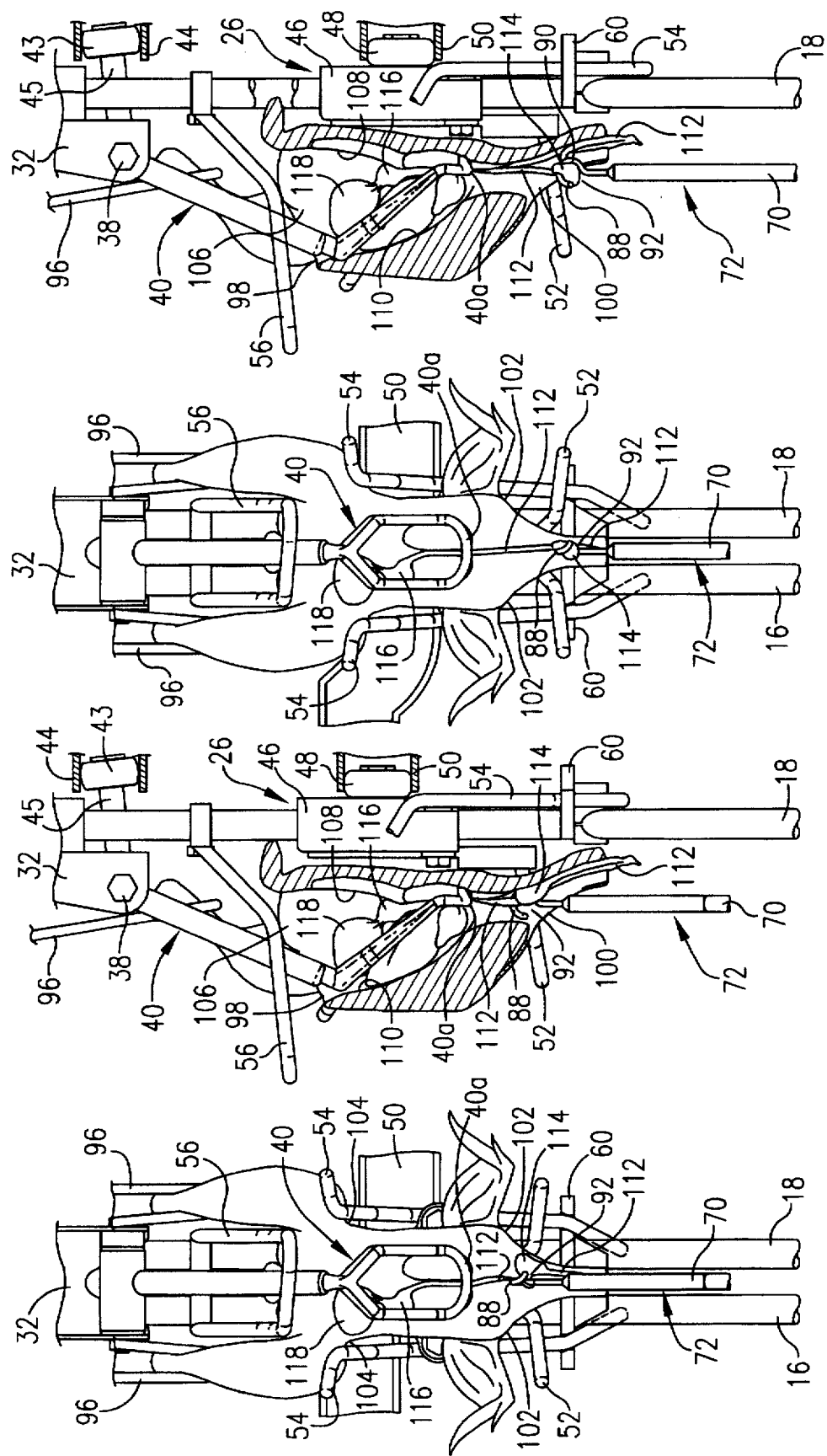

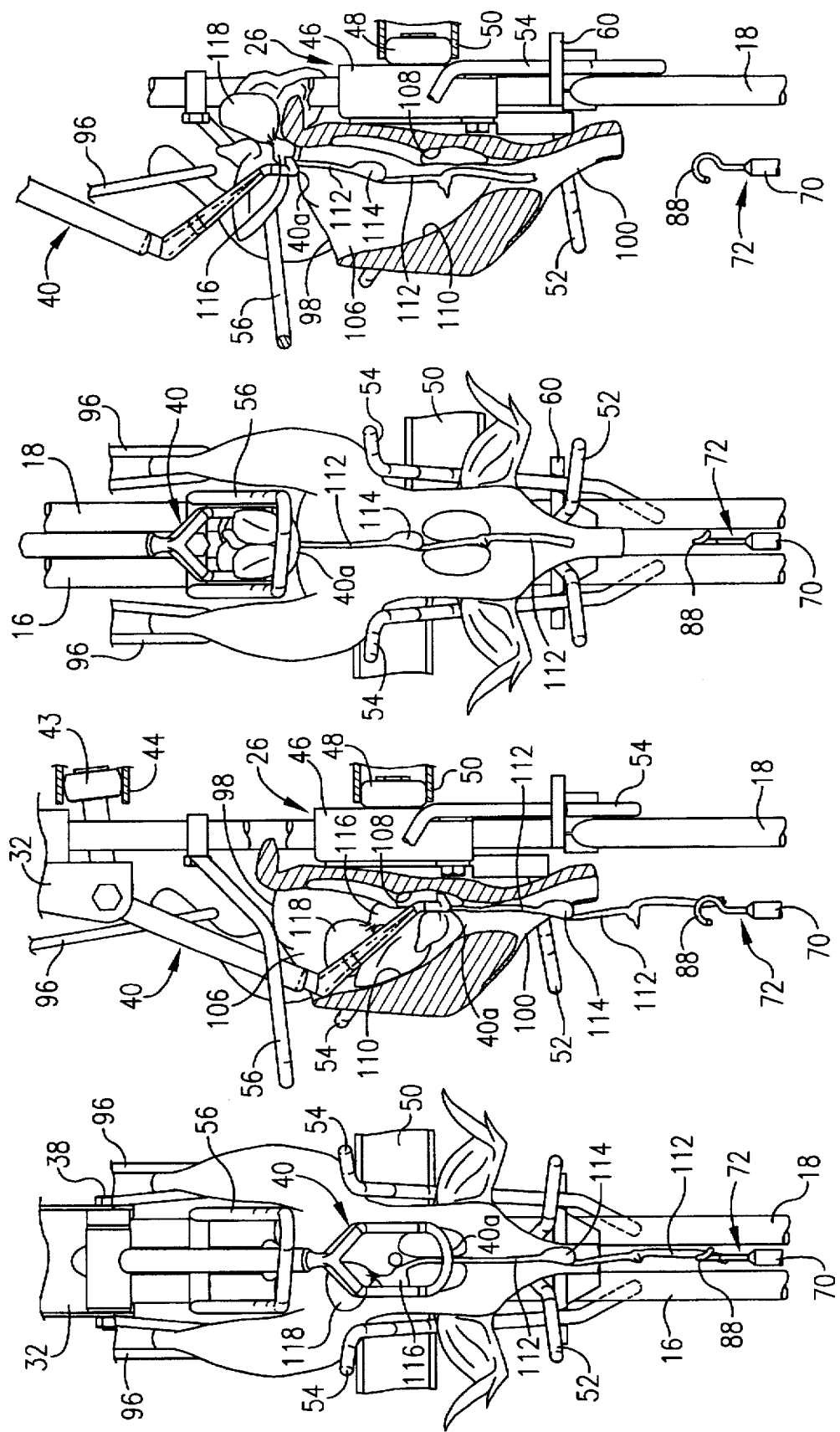

CROP INCLUSIVE POULTRY EVISCERATING METHOD AND APPARATUS

This is a continuation of application Ser. No. 08/589,114, filed Jan. 19, 1996 now abandoned.

TECHNICAL FIELD

The present invention relates to poultry processing and, more particularly, to a way of eviscerating a poultry carcass to remove the entire alimentary tract, including the crop, from the carcass as part of a high speed, mechanized system.

BACKGROUND

The crop or craw of a poultry carcass is attached to the walls of the body cavity by relatively strong tissues that can be difficult to dislodge during eviscerating operations. Thus, if the entire alimentary tract, including the esophagus, crop, stomach, gizzard, and other organs, is attempted to be removed in one piece as the stomach is pulled out of the body cavity, the connective tissues around the crop may resist so stubbornly that the esophagus tears from the stomach, leaving the crop behind as the rest of the tract is withdrawn. Consequently, an additional operation is then necessary to remove the leftover crop and esophagus from the carcass. Moreover, in the meantime the broken esophagus may spill undesirable digestive liquids and other materials into the body cavity.

SUMMARY OF THE INVENTION

Accordingly, one important object of the present invention is to provide a way of removing the entire alimentary tract, including the crop, from a poultry carcass wholly intact and without damage to any of the organs or other body parts. In carrying out this objective, the present invention contemplates the preliminary step of adequately dislodging or loosening the crop from the walls of the body cavity before the esophagus can be placed under severe tension during withdrawal of the cluster of viscera from the body cavity through an access opening at the vent end of the bird. Thus, the stubborn connective tissues which resist displacement of the crop from the body cavity are neutralized prior to the main drawing action. The crop is thus pulled along with the rest of the entrails by the esophagus as the entire alimentary tract is withdrawn.

Generally speaking, the point of attachment of the esophagus to the stomach is where most breaks occur if the tract is withdrawn by pulling on the organs before first dislodging the crop. Therefore, in accordance with the present invention, the esophagus is gripped and held motionless in an area between the crop and the stomach as the crop is being loosened prior to removal. This takes the tension off the weaker zone of attachment of the esophagus to the stomach and allows a relative aggressive tool to be used in stripping the crop free of its connective tissues before the main drawing action. Once the crop has been loosened, the grip on the esophagus is released so that the tract can be pulled out of the cavity.

Preferably, gripping of the esophagus to reduce tension at the weak spot is accomplished by tightly clamping the esophagus against the back wall of the cavity with the drawing spoon or loop that has been inserted as part of the eviscerating procedure. As the spoon clamps the esophagus tightly in place, a hook-like tool is inserted into the cavity through a cut in the neck and becomes entwined with the esophagus. When the tool is then pulled down along the esophagus, it breaks and tears the connective tissues from around the crop and dislodges the crop from the neck. The spoon is thereafter withdrawn upwardly out of the vent opening of the carcass, carrying the entire alimentary tract with it.

BRIEF DESCRIPTION OF THE DRAWINGS

FIG. 1 is a front elevational view of one eviscerating fixture and its associated cam track laid out in a linear flat pattern for purposes of illustrating the principles of the present invention;

FIG. 2 is a vertical cross-sectional view through the fixture and track of FIG. 1 taken substantially along line 2—2 of FIG. 1;

FIG. 3 is an enlarged, fragmentary top plan view of the gear teeth segments along the lower portion of the system which rotates the crop loosening tool when that tool is within the body cavity of the carcass;

FIG. 4 is an enlarged, fragmentary rear elevational view of the carcass carriage of the fixture illustrating details of construction;

FIG. 5 is a top, horizontal cross-sectional view of the carriage taken just above the slide block thereof;

FIG. 6 is a horizontal cross-sectional view through the carriage just above the lower end thereof illustrating the cam plate that causes actuation of carcass stabilizing arms on the carriage;

FIG. 7 is an enlarged, fragmentary, front elevational view of the hook-shaped eyelet at the upper end of the crop loosening tool;

FIG. 8 is a side elevational view thereof;

FIGS. 9 and 10 are front and side elevational views respectively of the fixture corresponding generally to region A in FIG. 1 as a carcass is being initially received by the carriage;

FIGS. 11 and 12 are front and side elevational views respectively of the fixture corresponding generally to region B in FIG. 1 and showing the carriage and stabilizing arms lifting the carcass up against the locating bar of the fixture to prepare the carcass for evisceration;

FIGS. 13 and 14 are front and side illustrations respectively of the fixture corresponding generally to region C in FIG. 1 in which the carcass is fully stabilized up against the locating bar and the crop loosening tool is moving closer to entering the neck of the bird;

FIGS. 15 and 16 are front and side elevational views respectively of the fixture respectively corresponding generally to region D in FIG. 1 wherein the crop loosening tool has fully entered the body cavity, has been rotated 180°, and is in position to become involved with the esophagus while the main removal spoon has entered the vent end of the cavity and is positioned along the breast bone;

FIGS. 17 and 18 are front and side elevational views respectively of the fixture corresponding generally to region E of FIG. 1 wherein the loosening tool has retracted slightly along the esophagus and the spoon is ready to clamp the esophagus against the backbone;

FIGS. 19 and 20 are front and side elevational views respectively of the fixture corresponding generally to region F of FIG. 1 wherein the spoon has tightly clamped the esophagus against the backbone and the loosening tool has rotated another 180° and has started slipping down along the crop and esophagus;

FIGS. 21 and 22 are front and side elevational views respectively of the fixture corresponding generally to region G of FIG. 1 wherein the tool continues to slip down along the esophagus to break connective tissues between the crop and the back wall of the body cavity as the removal spoon continues to clamp the esophagus against the backbone;

FIGS. 23 and 24 are front and side elevational views respectively of the fixture corresponding generally to region H of FIG. 1 wherein the tool has loosened the crop and has been withdrawn from the neck while the spoon is still clamping the esophagus against the backbone; and FIGS. 25 and 26 are front and side elevational views respectively of the fixture corresponding generally to region I of FIG. 1 wherein the removal tool has drawn the viscera up and out of the body cavity with the crop wholly intact.

DETAILED DESCRIPTION

The eviscerating fixture 10 in FIGS. 1 and 2 is shown mounted on a pair of horizontal, parallel rails 12 and 14 for movement from left to right as FIG. 1 is viewed. In actual practice instead of the flat, linear arrangement of FIG. 1, it is contemplated that a number of the fixtures 10 will be mounted upon a carousel-like, rotary structure of the type in conventional use and well understood by those skilled in the art. Even though only a single fixture is illustrated in FIG. 1, it is believed that the principles of the present invention will be readily understood by those skilled in the art.

The fixture 10 includes a pair of upright, parallel, laterally spaced apart guide rods 16 and 18 that extend between upper and lower support brackets 20 and 22 respectively. The upper bracket 20 is slidable along the top rail 12, while the lower bracket 22 is slidable along the bottom rail 14.

The rods 16, 18 carry three separate, vertically shiftable structures, namely eviscerating mechanism 24 at the upper end of the rods 16, 18 for eviscerating the poultry carcass, a carcass supporting carriage 26 in the middle of the rods 16, 18, and crop loosening apparatus 28 at the lower end of the rods 16, 18. The large flat panel 30 behind the fixture 10 contains a number of cam tracks (as subsequently explained) for controlling the various movements of the eviscerating mechanism 24, the carriage 26 and the crop loosening apparatus 28 as the fixture 10 moves from left to right viewing FIG. 1.

Dealing first with the eviscerating mechanism 24, such mechanism includes a slide 32 received on the rods 16, 18 and having a cam following roller 34 projecting rearwardly therefrom into a cam track 36 on the panel 30. A horizontal pivot 38 at the lower end of the slide 32 swingably supports an eviscerating device or spoon 40 in the form of a rigid loop 42. The loop 42 has a pair of mutually spaced legs 41 interconnected by a transverse bight 40a. The spoon 40 is adapted to swing inwardly and outwardly about the pivot 38 under the control of a rearwardly disposed cam following roller 43 that is carried by a crank arm 45 rigidly affixed to the spoon 40. The roller 43 is received within and operated by a cam track 44 on the panel 30.

Carriage 26 comprises a block 46 that is slidable up and down along the rods 16, 18 to the extent determined by a rearwardly disposed cam roller 48 received within a cam track 50 on the panel 30. The block 46 carries with it a generally outwardly and downwardly projecting stabilizer yoke 52 located near the bottom of the block 46, and a pair of upwardly and outwardly projecting stabilizer arms 54 that cooperate with a stationary leg spreader bar 56 on the rods 16, 18 above the block 46 to locate, orient and stabilize the poultry carcass during evisceration. The stabilizer arms 54 are secured to the block 46 by a pair of fore-and-aft pivots 58 so that the stabilizer arms 54 can swing toward and away from one another about the pivots 58. Such pivoting movement of the arms 54 is controlled by a stationary cam plate 60 (see also FIGS. 4 and 6) having forwardly opening notches 62 (FIG. 6) that slidably receive the lower ends of the stabilizer arms 54 so as to cam the upper ends of the arms toward and away from one another as the block 46 rises and falls on the guide rods 16, 18. Further details of construction and operation of the stabilizer arms 54 and stabilizer yoke 52 may be found in co-pending application Ser. No. 08/589,116 filed Jan. 19, 1996 and titled Poultry Processing Mechanism Having Carcass Stabilizer.

The crop loosening apparatus 28 at the lower end of the fixture 10 includes a slide 64 received on the rods 16, 18 and moved up and down along the same to the extent determined by a rearwardly disposed cam following roller 66 received within a track 68 on the panel 30. The slide 64 rotatably receives the long, upright shank 70 of a crop loosening tool 72. The shank 70 can rotate within the slide 64 but cannot move vertically relative thereto. Below the slide 64, the shank 70 of the tool 72 projects through a guide collar 74 rigidly fixed to the lower support bracket 22. The guide collar 74 has a generally annular drive gear 76 rotatably supported on its lower end, such drive gear 76 having a rectangular center bore 78 (FIG. 3) that matingly receives the shank 50 which is also of rectangular cross-sectional configuration. Thus, although the shank 70 can slip axially through the bore 78 of the drive gear 76, when the drive gear 76 is rotated, the shank 70 is also caused to turn. A horizontal drive plate 80 extending from left to right in FIG. 1 and fixed to the panel 30 at the level of the drive gear 76 is provided with a pair of toothed gear segments 82 and 84 (see also FIG. 3) for meshing with the gear 76 at predetermined locations along the path of travel of the fixture 10 to effect turning of the loosening tool 72.

FIGS. 7 and 8 show details of construction of the working tip of the tool 72. As illustrated, the tip 86 comprises a formed metal rod shaped in the nature of a hook 88 presenting an eyelet 90. The eyelet 90 is not completely closed by the metal rod of the hook 88 but instead has an entry 92 generally facing outwardly and downwardly in the axial direction of the shank 70 and toward the latter. The terminal end of the hook 88 is curved out of the plane of the hook 88 for a short distance to present a curved guide finger 94. As will be seen, the guide finger 94 points generally in the direction of rotation of the tool 72 as it is turned during operation such that the finger 94 leads the rest of the hook 88 during such turning.

OPERATION

As illustrated in FIGS. 9–26, it is contemplated that a poultry carcass will be presented to the fixture 10 suspended by its hocks from an overhead shackle 96. Both the shackle 96 and the fixture 10 are moving from left to right (viewing FIG. 1) at the same speed so that processing operations on the carcass can be carried out by the fixture 10 as if both the carcass and the fixture were standing still. Parenthetically, it is to be noted here that although no specific drive means is illustrated in FIGS. 1 and 2 for the fixture 10 on the rails 12 and 14, it is contemplated that the carcass shackles will be part of an overhead conveyor line whose linear motion will also be used to drive the fixture and the rest of the carousel structure. In practice, a number of fixtures 10 will be provided on the machine, and the incoming shackled carcasses are coordinated with the fixtures so that the carcasses successively match up with corresponding fixtures and move around the carousel in concert with the fixture until the processing operation has been completed, at which time the line of shackles departs from the carousel to the next processing area.

FIGS. 9 and 10 correspond to the condition of things in region A of FIG. 1. In this condition, the carcass has swung into the fixture 10 with its breast facing outwardly and its back up against or close to the block 46 of the carriage 26. The thighs of the carcass are spread apart on opposite sides of the spreader bar 56, the shoulder yoke 52 is spaced down below the shoulders of the carcass, and the stabilizer arms 54 are out of significant contact with the carcass. Basically, the carcass is in a relaxed condition suspended by the shackles 96 and not yet gripped and stabilized by the fixture. Prior to being received on the fixture 10, the carcass has passed through a venting and opening procedure which forms an enlarged opening 98 at the vent end of the carcass. In addition, a neck cut 100 (FIG. 9 has been made in the front of the neck to provide an entry opening for the crop loosening tool 72.

As the fixture 10 travels through region A, there is no actuation of the spoon 40, the carriage 26, or the tool 72, except that near the end of region A the cam track 50 for the carriage 26 inclines upwardly such that the block 46 is caused to rise on the rods 16, 18. This has the effect of starting to pull the shoulder yoke 52 up toward the shoulders 102 of the carcass and to cam the stabilizer arms 54 inwardly and upwardly toward the hips 104 of the carcass as the lower ends of the arms 54 move through the cam slots 62 on plate 60.

FIGS. 11 and 12 correspond generally to region B in FIG. 1. In this area the carriage block 46 is rising so that the upper ends of the stabilizer arms 54 are swinging in toward the hips 104 of the carcass and the shoulder yoke 52 is moving up closer to the shoulders 102. Also at this time, the spoon 40 is moving downwardly and outwardly toward the opening 98 in the carcass, and the tool 72 is moving toward the neck cut 100.

FIGS. 13 and 14 correspond generally to region C of FIG. 1. By this time the stabilizer arms 54 have squeezed against the trunk of the carcass and have lifted the carcass slightly by the hips 104 until the vent end of the carcass is pressed up against the leg spreader bar 56. At this time the weight of the carcass is carried primarily by the stabilizer arms 54 as they clamp the vent end of the carcass up against the bar 56 and lift the hocks of the bird slightly in the shackles 96. The spoon 40 is entering the cavity 106 through the opening 98 at this time and is swinging out away from the back wall 108 of the cavity toward the breast or front wall 110. The loosening tool 28 is approaching the neck cut 100 and, by the end of region C, has entered the neck cut 100 and moved up into the body cavity 106.

FIGS. 15 and 16 correspond generally to region D in FIG. 1. During this period, the carriage block 46 remains at a constant height so that the stabilizer arms 54 continue to grip, stabilize and center the carcass on the block 46 and up against the spreader bar 56. The shoulder yoke 52 remains tightly engaged with the shoulders 102. The spoon 40 continues to plunge down into the body cavity 106, moving along the breast bone as illustrated in FIG. 16 in a curved path of travel that eventually leads over to the back wall 108 of the cavity. In the meantime, the loosening tool 72 has moved into the body cavity through the neck cut 100 and is disposed generally alongside the esophagus 112 above the crop 114 and just below the stomach 116 and the gizzard 118. In addition, after reaching its full insertion point, the tool 72 has been rotated 180° by engagement of the toothed segment 82 with the drive gear 76 (see FIGS. 1 and 3) so that the hook 88 now faces toward the back of the carcass.

Such rotation of the hook 88 has been in a counterclockwise position as the hook 88 is viewed from the top in FIGS. 15 and 16. Accordingly, the guide finger 94 leads as the hook 88 is turned, thus presenting the entry 92 of the eyelet 90 to the esophagus 112 as such turning is carried out. The net result is that the stretch of the esophagus below the stomach 116 slips into the eyelet 90 as shown in FIGS. 15 and 16.

FIGS. 17 and 18 correspond generally to the condition of things in region E of FIG. 1. As the fixture 10 is in region D approaching region E, the downslope of the cam track 68 (FIG. 1) causes the loosening tool 72 to be retracted slightly so that the hook 88 moves down from its position just below the stomach 116 to its FIGS. 17, 18 position just above the crop 114. The hook 88 remains just above the crop 114 as the spoon 40 reaches the low point in its travel within the body cavity 106 and swings over against the back wall 108 as illustrated in FIG. 18. In region E the hook 88 merely waits at its position just above the crop 114 as the spoon 40 moves tightly against the back wall 108 such that the bight 40a presses and clamps the esophagus 112 against the backbone of the carcass at a point just below the weak point of attachment of the esophagus 112 to the stomach 116. This last bit of clamping movement of the spoon 40 against the backbone comes about through the continued downward incline of the upper cam track 36 in this region (FIG. 1) and the essentially level condition of the cam track 44 at this time, resulting in further counterclockwise swinging of the spoon 40 viewing FIG. 18.

The final clamping position of the spoon 40 against the back wall of the body cavity is illustrated in FIGS. 19 and 20, which corresponds generally to region F in FIG. 1. By this time, the gear 76 associated with the loosening tool 72 has encountered the second toothed segment 84 on the drive track 80 (FIGS. 1 and 3), causing the hook 88 to turn through a second 180° of rotation so that the entry 92 again faces toward the breast of the bird. This causes the esophagus 112 to become intertwined or involved with the hook 88 as illustrated in FIGS. 19 and 20.

Also in region F, the carriage block 46 encounters a short decline in the cam track 70. This has the effect of lowering the block 46 a short distance so that the shoulder yoke 52 retracts somewhat from the shoulders 102 and the stabilizer arms 54 release some of their grip upon the hips 104. It is believed that this relaxation of the yoke 52 from the shoulders 102 is particularly helpful in stripping the crop 114 from the carcass which occurs when the tool 72 is retracted from its position of FIGS. 19,20.

FIGS. 21 and 22 correspond generally to region G of FIG. 1. The esophagus 112 remains tightly clamped by the spoon 40 against the backbone of the carcass and the loosening tool 72 is retracting from the body cavity 106. During such retraction of the tool 72, the hook 88 slips down along the esophagus 112 and the crop 114 squirts through the eyelet 90. Even though the portion of the esophagus 112 above the crop 114 is placed under some tension as the hook 88 pulls down on the crop, the weak region of the esophagus 112, at its connection to the stomach 116 is safely insulated from such tension by the action of tool 40 against the esophagus. Moreover, other than at its connection point with the stomach, the esophagus itself is fairly tough and does not break under the strains normally placed upon it by the withdrawing hook 88.

As the hook 88 moves down the esophagus 112 and the crop 114 squirts through the eyelet 90, connective membranes and tissues between the crop 114 and the back wall of the body cavity and the neck of the carcass are stripped and severed so that the crop 114 becomes dislodged and loosened from the carcass. Thus, by the time the fixture reaches region H of FIG. 1 corresponding generally to FIGS. 23 and 24, the tool 72 has been fully retracted and the crop 114 is thoroughly loosened from the carcass. This allows the spoon 40 to start its drawing stroke up along the back wall of the body cavity 106. Because the esophagus 112 has become looped over the bight 40a of the spoon 40 as the spoon has swung in toward the back wall and then pulled upwardly, the esophagus is used by the spoon to drag the components of the alimentary tract and other connected organs up out of the body cavity. Since the crop 114 is no longer attached to the neck and body cavity, it is pulled along by the esophagus 112 toward the opening 98 of the vent end of the bird. By the time the eviscerating fixture 10 reaches region I of FIG. 1 corresponding generally to FIGS. 25 and 26, most of the entrails have been cleared out of the body cavity 106 in a position where they can be examined or otherwise dealt with, it being noted that the crop 114 is still attached to such entrails via the esophagus 112.

Thus, it will be seen that the method and apparatus of the present invention provides a way of removing the entire alimentary tract, and its attached organs, from the carcass in a single series of processing steps at a single machine. Very significant production efficiencies can be obtained as a consequence.

Moreover, by not damaging or breaking the alimentary tract during such process, the risk of contamination is greatly reduced. If at the earlier kill station the neck is severed in what might be termed a front throat cut, the esophagus will most likely be separated from the trachea such that the trachea will be left in the neck following evisceration. However, if a side cut is used at the kill station such that the trachea remains with the esophagus and a valve at the intersection of the trachea and esophagus remains intact, the esophagus will remain sealed or closed by the valve so that no digestive materials can escape during evisceration.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

We claim:

1. In equipment for use in removing the alimentary tract, including the crop, from a poultry carcass having a body cavity with opposed openings at the neck and vent ends of the carcass, the improvement comprising:

apparatus including a tool insertable into the body cavity of the carcass via one of said opposed openings for loosening the crop from the carcass without breaking the esophagus before the tract is removed; and mechanism including a device insertable into the body cavity of the carcass via the other of said opposed openings and operable, after the tool has loosened the crop, to withdraw the tract from the carcass.

2. In equipment as claimed in claim 1, said tool being insertable into the body cavity of the carcass through the neck end of the carcass, said apparatus including means for manipulating the tool to loosen the crop while the tool is within the cavity.

3. In equipment as claimed in claim 2, said tool having a shank adapted to extend generally parallel to and alongside the esophagus when the tool is within the cavity, said shank having a tip configured to loosely entwine the esophagus when the shank is turned about its longitudinal axis while disposed alongside the esophagus, said means for manipulating the tool being operable to effect said turning of the shank about its longitudinal axis to loosely entwine the esophagus and to retract the shank along the esophagus away from the stomach while the esophagus is loosely entwined in the tip whereby to separate the crop from the carcass as the esophagus and crop slip loosely through the retracting tip.

4. In equipment as claimed in claim 3, said tip being generally hook-shaped, presenting an eyelet and an entry to said eyelet facing generally axially of the shank in the direction of retraction thereof.

5. In equipment as claimed in claim 4, said tip having an outturned guide finger at the terminal end thereof projecting out of the plane of the eyelet in the direction of turning of the tool during entwining of the esophagus for facilitating entry of the esophagus into the eyelet.

6. In equipment as claimed in claim 1, said device being operable to withdraw the tract from the body cavity of the carcass through an opening at the vent end of the carcass, said mechanism including means for causing the device to hold the esophagus against breakage while the tool is loosening the crop.

7. In equipment as claimed in claim 6, said device having a portion disposed to press and hold the esophagus against the back wall of the body cavity while the tool is loosening the crop.

8. In equipment as claimed in claim 7, said device comprising a rigid loop having a pair of mutually spaced legs and a bight interconnecting said legs at a working end of the loop, said bight comprising the portion of the device disposed to press and hold the esophagus against the back wall of the body cavity while the tool is loosening the crop.

9. In equipment as claimed in claim 8, said tool being insertable into the body cavity of the carcass through the neck end of the carcass, said apparatus including means for manipulating the tool to loosen the crop while the tool is within the cavity.

10. In equipment as claimed in claim 9, said tool having a shank adapted to extend generally parallel to and alongside the esophagus when the tool is within the cavity, said shank having a tip configured to loosely entwine the esophagus when the shank is turned about its longitudinal axis while disposed alongside the esophagus, said means for manipulating the tool being operable to effect said turning of the shank about its longitudinal axis to loosely entwine the esophagus and to retract the shank along the esophagus away from the stomach while the esophagus is loosely entwined in the tip whereby to separate the crop from the carcass as the esophagus and crop slip loosely through the retracting tip.

11. In equipment as claimed claim 10,
said tip being generally hook-shaped, presenting an eyelet and an entry to said eyelet facing generally axially of the shank in the direction of retraction thereof.

12. In equipment as claimed in claim 11,
said tip having an outturned guide finger at the terminal end thereof projecting out of the plane of the eyelet in the direction of turning of the tool during entwining of the esophagus for facilitating entry of the esophagus into the eyelet.

13. In equipment as claimed in claim 12; and
a carriage for receiving and moving the carcass along a path of travel as the crop is loosened and the tract is withdrawn.

14. In equipment as claimed in claim 1; and
a carriage for receiving and moving the carcass along a path of travel as the crop is loosened and the tract is withdrawn.

15. In equipment for use in removing the alimentary tract, including the crop, from a poultry carcass, the improvement comprising:
a carriage for receiving and moving the carcass along a path of travel;
mechanism for performing a drawing operation on the tract including a device for withdrawing the tract from the body cavity of the carcass through an opening at the vent end of the carcass as the carriage moves along said path of travel,
said mechanism including means for causing the device to hold the esophagus against breakage during a portion of the drawing operation before the device withdraws the tract from the carcass; and
apparatus including a tool for loosening the crop from the carcass while the esophagus is being held by the device,
said apparatus including means for inserting the tool into the body cavity through the neck end of the carcass and loosening the crop from the carcass without detaching the crop from the tract,
said mechanism further including means for causing the device to complete its drawing operation after the crop has been loosened by the tool.

16. In equipment as claimed in claim 15,
said device having a portion disposed to press and hold the esophagus against the back wall of the body cavity while the apparatus is loosening the crop.

17. In equipment as claimed in claim 16,
said device comprising a rigid loop having a pair of mutually spaced legs and a bight interconnecting said legs at a working end of the loop,
said bight comprising the portion of the device disposed to press and hold the esophagus against the back wall of the body cavity while the apparatus is loosening the crop.

18. In equipment as claimed in claim 17,
said tool having a shank adapted to extend generally parallel to and alongside the esophagus when the tool is within the cavity,
said mechanism further including means for turning the shank about a longitudinal axis extending axially of the shank when the tool is within the body cavity,
said shank having a tip configured to loosely entwine the esophagus when the shank is turned about its longitudinal axis while disposed alongside the esophagus,
said mechanism further including means for retracting the shank along the esophagus away from the stomach while the esophagus is loosely entwined in the tip whereby to separate the crop from the carcass as the esophagus and crop slip loosely through the retracting tip.

19. In equipment as claimed in claim 18,
said tip being generally hook-shaped, presenting an eyelet and an entry to said eyelet facing generally axially of the shank in the direction of retraction thereof.

20. In equipment as claimed in claim 19,
said tip having an outturned guide finger at the terminal end thereof projecting out of the plane of the eyelet in the direction of turning of the tool during entwining of the esophagus for facilitating entry of the esophagus into the eyelet.

21. In equipment as claimed in claim 15,
said tool having a shank adapted to extend generally parallel to and alongside the esophagus when the tool is within the cavity,
said mechanism further including means for turning the shank about a longitudinal axis extending axially of the shank when the tool is within the body cavity,
said shank having a tip configured to loosely entwine the esophagus when the shank is turned about its longitudinal axis while disposed alongside the esophagus,
said mechanism further including means for retracting the shank along the esophagus away from the stomach while the esophagus is loosely entwined in the tip whereby to separate the crop from the carcass as the esophagus and crop slip loosely through the retracting tip.

22. In equipment as claimed in claim 21,
said tip being generally hook-shaped, presenting an eyelet having an entry to said eyelet facing generally axially of the shank in the direction of retraction thereof.

23. In equipment as claimed in claim 22,
said tip having an outturned guide finger at the terminal end thereof projecting out of the plane of the eyelet in the direction of turning of the tool during entwining of the esophagus for facilitating entry of the esophagus into the void of the eyelet.

24. In a method of removing the alimentary tract, including the crop, from a poultry carcass, the steps of:
loosening the crop from the carcass before the tract is removed; and
withdrawing the tract from the carcass after the crop has been loosened.

25. In a method of removing the alimentary tract from a poultry carcass as claimed in claim 24,
said stop of loosening the crop being carried out while the esophagus is held against disconnection from the stomach.

26. In a method of removing the alimentary tract from a poultry carcass as claimed in claim 25,
said step of holding the esophagus against disconnection from the stomach being carried out using a device that enters the body cavity of the carcass from the stern end of the carcass,
said step of loosening the crop being carried out using a tool that enters the body cavity through the neck end of the carcass.

27. In a method of removing the alimentary tract from a poultry carcass as claimed in claim 26,
said holding of the esophagus being carried out by pressing the esophagus against the back wall of the body cavity.

28. In a method of removing the alimentary tract from a poultry carcass as claimed in claim 27, said loosening of the crop being carried out by breaking connecting tissues between the crop and the wall of the body cavity with the tool.

29. In a method of removing the alimentary tract from a poultry carcass as claimed in claim 25, said loosening of the crop being carried out by breaking connecting tissues between the crop and the wall of the body cavity with the tool.

30. In a method of removing the alimentary tract from a poultry carcass as claimed in claim 29, said tool being provided with a shank having a generally hook-shaped eyelet, said loosening of the crop including the step of turning the shank and the eyelet about the longitudinal axis of the shank while the eyelet is alongside the esophagus between the crop and the stomach whereby to intertwine the esophagus with the eyelet, said loosening of the crop including the further step of pulling the eyelet down along the esophagus and passing the crop through the eyelet as the esophagus remains held by the device.

31. In a method of removing the alimentary tract from a poultry carcass as claimed in claim 30; and the additional step of supporting the carcass on a moving carriage as the loosening and withdrawing steps are carried out.

32. In a method of removing the alimentary tract from a poultry carcass as claimed in claim 24; and the additional step of supporting the carcass on a moving carriage as the loosening and withdrawing steps are carried out.

* * * * *